Patented July 26, 1938

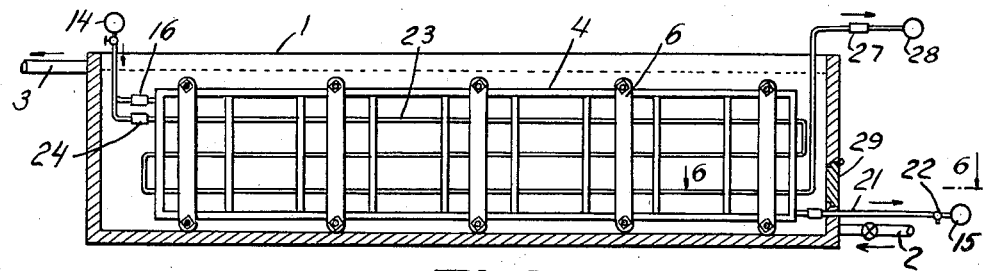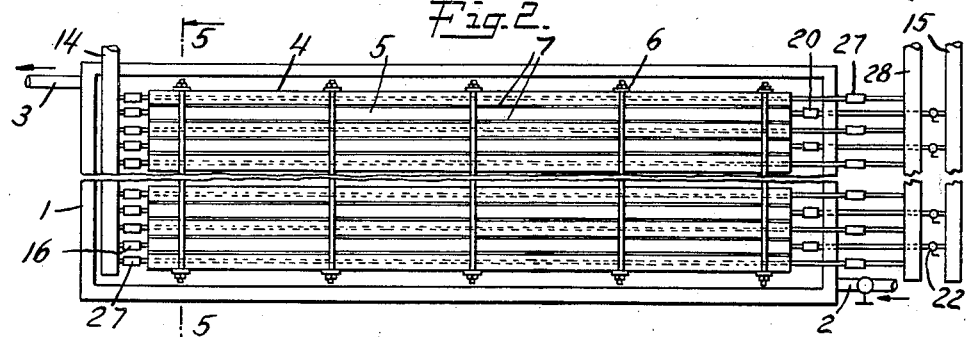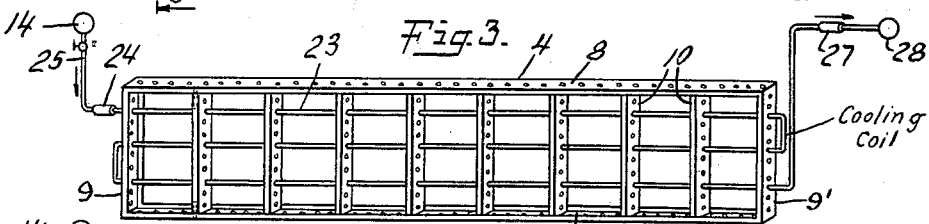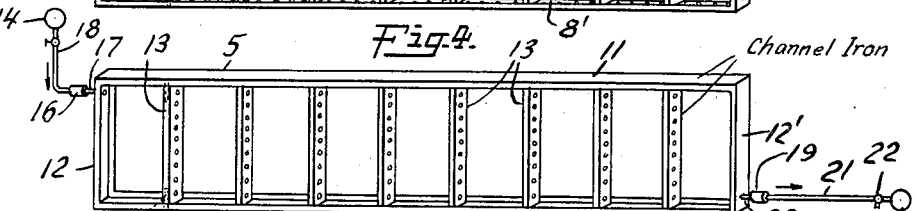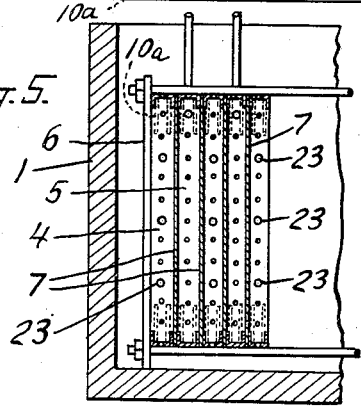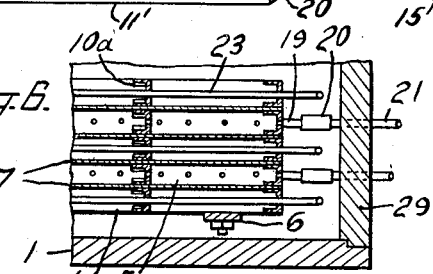

2,124,861

UNITED STATES PATENT OFFICE 2,124,861

DIALYTIC APPARATUS

Arthur W. Saddington and Arlie P. Julien, Syracuse, N. Y., assignors to The Solvay Process Company, New York, N. Y., a corporation of New York Application April 24, 1936, Serial No. 76,252

8 Claims. (Cl. 23—252)

This invention relates to dialytic apparatus and is particularly directed to apparatus for effecting dialytic purification of solutions, for example sodium hydroxide solutions.

In the past various types of apparatus have been suggested for dialytic processes. The structure of the majority of these apparatuses generally resembles a filter press and comprises a series of cells, alternate cells being arranged for series or parallel flow of liquids in opposite directions therethrough, thus cells 1, 3, 5, 7, etc. would be arranged for flow of one liquid therethrough in either series or parallel and cells 2, 4, 6, 8, etc. would be arranged for counterflow of the second liquid. This structure requires a relatively large number of parts and is inordinately expensive to construct and operate. With the series flow apparatus, furthermore, the stoppage or breakage of a single cell necessitates shutting off the entire apparatus for repairs.

It has been proposed to place a plurality of membranous bags or envelopes in a tank each bag being held in distended position by means of suitable springs. This type of apparatus, however, requires the use of heavy diaphragm material in view of the strain placed upon it by the distending mechanism. Reduced efficiency with respect to production capacity results. Then too this structure exposes a large surface area of the equipment to the action of the caustic soda and requires especial care in the selection of materials to avoid deterioration of equipment and contamination of solution from this source.

The invention has for its object provision of simpler, more efficient dialytic apparatus which is lower in cost and more convenient to operate than prior dialytic apparatus.

In accordance with this invention a clamped bundle of alternately perforate and imperforate rigid frames is arranged in a tank with dialytic membranes spaced and held in position by the frames. The imperforate frames are provided with inlets connected in parallel and outlets connected in parallel; flow through perforate frames is naturally in parallel. This avoids the difficulties encountered in series flow types of cells and at the same time eliminates the complications presented by former parallel flow apparatus.

The following is a description of a preferred embodiment of our dialytic apparatus having reference to the accompanying drawing wherein, Fig. 1 is a vertical section of one form of the apparatus;

Fig. 2 is a plan view thereof;

Figs. 3 and 4 are detail views showing the construction of the diaphragm supporting frames of the apparatus of Figs. 1 and 2, and Figs. 5 and 6 are segmentary sections on lines 5—5 of Fig. 2 and 6—6 of Fig. 1 respectively.

In the apparatus shown in the drawing the numeral 1 designates a rectangular tank having inlet and outlet pipes 2 and 3 respectively for introduction of solution to be purified and for withdrawal of residual solution. Within tank 1 there is disposed a plurality of alternately perforate and imperforate frames 4 and 5 suitably clamped together into a bundle by means of clamps 6 or other suitable clamping means. Separating the individual frames are vertical dialytic membranes 7 of any suitable diaphragm material such as parchmentized cellulose.

The perforate frames 4 have apertures, preferably along their top and bottom members 8 and 8' and end members 9 and 9' as shown in Fig. 3 to provide access for liquid contained in tank 1 directly into the interiors of these frames. The frames preferably consist of metal channel members (of U-shaped cross-section) 8, 8', 9, and 9' having their open sides, i. e. the mouth of the U, facing the center of the frame and arranged so that the frame is rectangular or trapezoidal with the base much longer than the upright members. Preferably the channels are slightly wider at the open side than at the closed side so that when a series of frames are clamped together the resilience of the frames provides sufficient tension to hold the diaphragms firmly in place throughout the length of each frame without excessive pressure on the diaphragm at any particular point along the frame. This resilience may be supplanted or augmented by providing the frames with a coating of rubber or similar material suitably affixed thereto. Within each frame are a plurality of vertical bracing members 10 which also are preferably perforate and which also may be of channel cross-section.

The combination of channel frames with vertical channel braces provides a particularly rigid construction. As shown in the drawing the sides of the vertical members 10 abut the sides of the top and bottom frame members 8 and 8'. Small strips or plates 10a may be welded to the inside face of these abutting channel sides so as to provide a pair of butt joints at each end of each of the vertical members. Members 10 need not be vertically disposed but may be arranged at angles to the vertical to provide a triangular bracing structure. While the members 10 have been illustrated as provided with apertures uniformly along their length, this is not essential and the apertures may be concentrated at the top and bottom. It is possible to do away entirely with these apertures. In such case each section of the frame serves as an individual dialytic frame, the liquid traveling therein from bottom to top. The provision of holes along the vertical braces permits longitudinal flow of liquid and thus assures uniformity of operation even though local stoppages of the diaphragm may occur. It also serves to reduce the weight of the apparatus. It may be remarked that in general a few large holes are of more value than many small ones in that not only is the chance of clogging minimized but also the area of metal exposed to caustic is reduced and the contamination due to action of caustic on this material is minimized.

The imperforate frames 5 may be of substantially the same construction as the perforate frames but the top, bottom, and end members 11, 11', 12, 12' have no apertures therethrough so that liquid in the tank 1 cannot enter the interior of these frames except through the dialytic membranes covering the faces thereof. The vertical supports 13 of frames 5 are preferably perforate like the vertical supporting members 10 of frames 4 and correspond in location to the similar members in the perforate frames to provide bearing points to support the diaphragms. The frames 5 are provided with inlet connections arranged for union with a suitable header 14 and outlet connections for connection with an outlet header 15. As illustrated, each inlet connection may comprise a flexible rubber tube 16 joining a pipe 17 welded or otherwise affixed to the frame and a valved pipe 18 joining the header 14 and each outlet connection may comprise a flexible rubber tube 19 joining a pipe 20 similarly affixed to the frame and a pipe 21 joined to the header 15. Preferably the pipe 21 is provided with a test cock 22 (by means of which liquid may be withdrawn to determine whether the dialyzing frame is functioning properly.)

The frames 4 and 5 are preferably of welded metal construction, the metal, which may be iron, steel, or a suitable corrosion-resistant alloy, should be of sufficient weight to provide rigidity. The importance of this rigidity becomes apparent when it is considered that the frames may be 10 feet long and around 2 feet high, whereas their thickness, that is the width of the channel members, for a frame of this size is preferably around ¾ of an inch.

In one of the preferred embodiments of this invention about 70 of the frames are employed in a single bundle, the vertical members 10 and 13 serve not only to provide rigidity to the frame but also to prevent excessive bulging of the diaphragms. It will be appreciated that in the purification of solutions by dialysis a solution passing along one side of the diaphragm generally has a higher concentration than the solution passing along the other side of the diaphragm. This difference in concentration and corresponding difference in liquid density causes a higher pressure on that side of the diaphragm exposed to the more concentrated solution. If diaphragms are insufficiently spaced, or if insufficient separators are provided, this bulging of the diaphragms becomes sufficient to bring adjacent diaphragms into actual physical contact thereby materially reducing the efficiency of the dialytic apparatus. With large frames and weak parchments the pressure differential may be sufficient to cause failure of the diaphragm. In the applicants' apparatus illustrated in the drawing, the length of the frames is approximately five times their height. With this general arrangement a high ratio of surface to pressure differential is obtained and the disadvantages of different liquid densities are minimized. It may be noted further that the pressure does not result in bulging of the diaphragms in the direction of the more concentrated solution and accordingly greater latitude in the construction of the frames for containing the more concentrated liquid is permissible. It is desirable in the apparatus of this invention to employ the liquid to be purified in the form of a body of liquid in tank 1 so that the more concentrated liquid and accordingly the higher pressure is contained within the perforate frames 4. Hence these frames may be, if desired, narrower than the imperforate frames 5.

In the drawing inlets and outlets have been shown on diametrically opposite parts of the apparatus. Thus the inlet 2 is at the bottom and at one end of tank 1 whereas outlet 3 is at the top and at the opposite end.

In normal practice, if a substantial concentration differential prevails during dialysis, the flow through the dialyzer may be entirely vertical. For such processes the outlet may be arranged at the same end of the apparatus as the inlet, the latter being at the bottom, the former at the top. The concentrated liquid introduced anywhere along the bottom, because of its relatively high density, spreads out fairly uniformly over the bottom of the tank. Conversely, the more dilute liquid spreads out along the top and an outlet located anywhere along the top effects a skimming of the dilute liquid of low density without disturbing to any great extent the generally upward flow of liquid through the dialyzer. There are of course practical limits to the size of a dialyzer in which such gravity effects can alone be depended upon to provide proper flow.

In dialyses where no great change in density of liquids takes place, the outlets and inlets may be at opposite ends of the apparatus but at substantially the same level, countercurrent flow longitudinally through the apparatus being depended upon for the purification rather than the natural flow due to variations in density. In general the inlet and outlet of the tank should be remotely positioned in respect to each other and the inlet of frames 5 should be near the tank outlet and the outlet of frames 5 should be near the tank inlet.

The arrangement of inlets and outlets shown in the drawing takes advantage of both forced circulation in a longitudinal direction and natural gravity circulation in a vertical direction and accordingly is particularly advantageous.

Some reactions or purifications, such as the purification of concentrated caustic solutions described in our application Serial No. 76,250, filed on the same date as the present application, require cooling means for their successful operation. Accordingly all or part of the frames may be provided with a heat exchanger through which a cooling or heating fluid may flow. The provision of heat exchangers in the imperforate frames 5 requires provision against leakage through the frames at the points where the inlets and outlets to the heat exchangers enter and leave. When heat exchangers, for example cooling pipes, are employed, it is preferred therefore to employ them in the perforate frames 4, for example as illustrated in Fig. 3.

Referring to this figure, the numeral 23 designates a cooling pipe which makes a series of horizontal passes, preferably three passes, through the frame. The pipe is connected by means of a suitable connection, such as a flexible rubber tube 24, to a valved pipe 25 leading from a cooling liquid header, which may be header 14 or a different header. This will depend upon the nature of the liquids and also upon whether it is desired to operate flow of the water for dialysis entirely independently of any changes of pressure that might result from variations of cooling liquid flow. The other end of the pipe is connected by a suitable connection, such as a flexible rubber tube 27, to an outlet header 28 for the cooling liquid. When the frames are clamped into a bundle of alternately perforate and imperforate frames separated by diaphragms, each diaphragm 7, as shown in Figs. 2 and 5, is exposed on one side to the cooling effect of cooling pipes 23. For dialysis of dilute caustic solutions and many other materials cooling is unnecessary. In apparatus for dialysis of such materials the cooling coils need not be included.

For fitting the rubber tubes 19 to pipes 21, a door or cover plate 29 is provided at the end of tank 1. As an alternative each outlet connection may be run vertically within the tank to the top thereof so that these connections may be made above the liquid level as in the case of connection 27. Similarly the inlet tube connections 16 and 24 may be arranged above the liquid level. Such an arrangement permits ready detection of leaks and of course is desirable where the liquids treated exert an undesirable action on the tubing. Suitable means may be provided for adjusting the pressure on the outlets where necessary to compensate for change in position in the outlets.

Use of the apparatus of the present invention is especially simple and convenient. In preparing the apparatus for use a frame 4 may be laid flat on a suitable support and a sheet of parchment paper may be laid thereon. A frame 5 is then pressed on top of the parchment and a second parchment is placed on top of the frame 5. In each case the parchment should be sufficiently large to extend to the edges of the frame so that the edges of the parchment are pressed between the sides of the channel members of adjacent frames. The stacking of frames is continued until the desired number is arranged whereupon the stack is clamped and thereby compressed sufficiently to insure against leakage between the diaphragms and the adjacent frames. The entire bundle is then placed in tank 1 and the inlet and outlet connections are made and door 29 placed in position. The apparatus is then ready for operation.

A solution of the material to be purified is introduced through inlet 2 until the liquid level in tank 1 reaches the diaphragm material whereupon pure solvent is introduced through pipe 18 and the introduction of the two liquids is regulated so that the two levels rise together until the diaphragms are completely submerged. Thereupon the rates of introduction of these liquids and withdrawal (through pipes 21) of pure solvent containing solute received through the diaphragms and withdrawal (at 3) of residual solution from which such solute has been dialyzed are controlled so as to obtain the desired results.

If the dialysis generates heat because of dilution or for some other reason, cooling liquid may be passed through cooling pipes 23 by proper manipulation of the valves on lines 25.

We claim:

1. A dialyzer frame assembly comprising a plurality of perforate and imperforate frames having two sides of channel cross-section and two bases of channel cross-section, said two bases being substantially longer than said sides and being rigidly joined one to the other by a plurality of transverse members, said individual frames being arranged alternately in series with membranes therebetween to provide a series of open and closed compartments, at least some of said frames being constructed of channel members slightly wider at the open side than at the closed side so that adjacent edges of adjacent frames coact to provide a resilient seal and prevent leakage therebetween when the series of frames is compressed, and clamping means compressing said series of frames.

2. A dialyzing frame comprising a quadrilateral frame portion having the bases substantially longer than the sides, said bases and sides being of a resilient material and having a channel cross-section slightly wider at the open side than at the closed side of the channel, and a plurality of intermediate transverse members rigidly joining the two bases.

3. A dialyzing frame comprising a quadrilateral perforate frame portion having the bases substantially longer than the sides, said bases and sides being of a resilient material and having a channel cross-section slightly wider at the open side than at the closed side of the channel, and a plurality of intermediate transverse members rigidly joining the two bases.

4. A dialyzing frame comprising a quadrilateral frame portion having the bases substantially longer than the sides, said bases and sides being of channel cross-section, the open side of the channel being relatively wide with respect to the closed side, a plurality of intermediate transverse members rigidly joining the two bases, an inlet opening and an outlet opening through said channel arranged substantially diagonally of the frame and cooperating with inlet and outlet pipes to provide means for introduction and withdrawal of liquid from the space within said frame.

5. A dialyzer structural member comprising a quadrilateral frame portion having the bases substantially longer than the sides, said bases and sides being of channel cross-section, a plurality of intermediate transverse members rigidly joining the two bases, an inlet opening and an outlet opening through said channel arranged substantially diagonally of the frame and cooperating with inlet and outlet pipes provided with means for controlling flow of liquid through the space within said frame portion, and a heat exchanger attached thereto and centrally disposed therein for controlling the temperature of said liquid.

6. A dialyzer comprising in combination a tank having an inlet and an outlet, a bundle of alternately perforate and imperforate frames having sides and bases of channel cross-section with a plurality of intermediate transverse members rigidly joining the two bases within the tank adapted to be separated by dialytic membranes, said imperforate frames being provided with independent inlets and independent outlets separate from the inlet and outlet of said tank, means for separately controlling flow of liquid through each of said imperforate frames, and heat exchangers within at least a portion of said frames for controlling the temperature of the liquid therein.

7. A dialyzer comprising in combination a tank having an inlet and an outlet and within said tank a bundle of alternately perforate and imperforate frames having sides of channel cross-section and substantially longer bases of channel cross-section, and a plurality of transverse members rigidly joining the two bases, said frames being adapted to separate and firmly support dialytic membranes, said imperforate frames being provided with means to provide parallel flow of liquid therethrough and means for controlling flow of liquid through each imperforate frame separately.

8. A dialyzer for purifying concentrated caustic solutions comprising in combination a tank having an inlet and an outlet within said tank, a bundle of alternately perforate and imperforate frames having sides of channel cross-section and substantially longer bases of channel cross-section, and a plurality of transverse members rigidly joining the two bases, said frames being adapted to separate and firmly support dialytic membranes, said imperforate frames being provided with means to provide parallel flow of liquid therethrough, means for controlling flow of liquid through each imperforate frame separately, and cooling means positioned within at least a portion of said frames for withdrawing heat produced by the dialyzing process.

ARTHUR W. SADDINGTON.
ARLIE P. JULIEN.